(12) United States Patent
Wood

(10) Patent No.: US 12,194,485 B2
(45) Date of Patent: Jan. 14, 2025

(54) PREDICTIVE MAINTENANCE OF LIQUID PAINT SUPPLY SYSTEMS

(71) Applicant: Carlisle Fluid Technologies (UK) Ltd, Bournemouth (GB)

(72) Inventor: Nigel Wood, Dorset (GB)

(*) Notice: Subject to any disclaimer, the term of this patent is extended or adjusted under 35 U.S.C. 154(b) by 981 days.

(21) Appl. No.: 16/490,013

(22) PCT Filed: Feb. 15, 2018

(86) PCT No.: PCT/GB2018/050403
§ 371 (c)(1),
(2) Date: Aug. 29, 2019

(87) PCT Pub. No.: WO2018/158557
PCT Pub. Date: Sep. 7, 2018

(65) Prior Publication Data
US 2020/0009594 A1    Jan. 9, 2020

(30) Foreign Application Priority Data
Mar. 1, 2017   (GB) ..................................... 1703276

(51) Int. Cl.
*G05B 19/416* (2006.01)
*B05B 12/08* (2006.01)
(Continued)

(52) U.S. Cl.
CPC .............. *B05B 15/14* (2018.02); *B05B 12/08* (2013.01); *B05B 12/081* (2013.01);
(Continued)

(58) Field of Classification Search
None
See application file for complete search history.

(56) References Cited

U.S. PATENT DOCUMENTS 5,035,581 A * 7/1991 McGuire ............... E21B 47/047
417/63
5,301,120 A * 4/1994 Magario ............... B29C 45/768
702/187
(Continued)

FOREIGN PATENT DOCUMENTS

CN    104049627 A    9/2014
CN    106438387 A    2/2017
(Continued)

OTHER PUBLICATIONS

PCT/GB2018/050403 International Search Report mailed Apr. 23, 2018.
(Continued)

*Primary Examiner* — Charles Capozzi
(74) *Attorney, Agent, or Firm* — Peter J. Beardsley; Omnus Law

(57) ABSTRACT

A method and associated paint finishing system are disclosed for performing predictive maintenance on equipment used for delivering liquid paint in a paint finishing facility. The method comprises: identifying a set of components of the equipment and associated maintenance requirements; for each of the components, providing a set of operating parameters (401-404) that affect useful service life of the component; for each component, providing an algorithm (410) relating the operating parameters to a remaining time by when a maintenance operation on the component is to be performed; monitoring each of the operating parameters (401-404) during operation of the paint finishing facility; for each component, applying the algorithm (410) with the monitored operating parameters (401-404) to calculate the remaining time for the component (420); and for each component providing to a maintenance operative an alert indication relating to the remaining time for the component.

14 Claims, 8 Drawing Sheets

(51) Int. Cl.
  *B05B 12/10* (2006.01)
  *B05B 15/14* (2018.01)

(52) U.S. Cl.
  CPC ............ *B05B 12/085* (2013.01); *B05B 12/10* (2013.01); *G05B 19/416* (2013.01); *G05B 2219/45013* (2013.01)

(56) References Cited

U.S. PATENT DOCUMENTS

| | | | |
|---|---|---|---|
| 5,443,642 A | 8/1995 | Bienduga | |
| 6,306,319 B1* | 10/2001 | Swain | B29C 48/25 264/211.21 |
| 6,408,258 B1 | 6/2002 | Richer | |
| 2003/0090696 A1* | 5/2003 | Willis | G03G 15/553 358/1.14 |
| 2005/0011967 A1 | 1/2005 | Skelton-Becker et al. | |
| 2008/0183336 A1* | 7/2008 | Dykstra | G05B 13/041 700/282 |
| 2009/0204245 A1 | 8/2009 | Sustaeta et al. | |
| 2014/0355031 A1* | 12/2014 | Fukuda | G06K 15/4065 358/1.14 |
| 2015/0052978 A1 | 2/2015 | Beier | |
| 2015/0088434 A1* | 3/2015 | Grabau | F16K 37/0075 702/34 |
| 2017/0131694 A1* | 5/2017 | Pichler | B29C 45/78 |
| 2017/0175516 A1* | 6/2017 | Eslinger | F04D 15/0066 |
| 2019/0187679 A1* | 6/2019 | Strudwicke | G05B 23/0272 |

FOREIGN PATENT DOCUMENTS

| | | |
|---|---|---|
| DE | 10157143 A1 | 1/2007 |
| JP | H0317321 A | 1/1991 |
| JP | H0422454 A | 1/1992 |
| JP | H05309297 A | 11/1993 |
| JP | H107237090 A | 9/1995 |
| JP | 2000297443 A | 10/2000 |
| JP | 2001306729 A | 11/2001 |
| JP | 2003022129 A | 1/2003 |
| JP | 2009155841 A | 7/2009 |
| WO | 2013035687 A1 | 3/2013 |
| WO | 2016147483 A1 | 9/2016 |
| WO | 2016203795 A1 | 12/2016 |

OTHER PUBLICATIONS

Japanese Office Action for JP Application No. 2019-547300, dated Mar. 1, 2022, 5 pgs.
Chinese Office Action for CN Application No. 201880029404.X, dated Jan. 27, 2021, 11 pgs.
GB Search Report, Application No. GB1703276.4, dated Aug. 3, 2017, 4 pgs.

* cited by examiner

PREDICTIVE MAINTENANCE OF LIQUID PAINT SUPPLY SYSTEMS

The present invention relates to a system and method for performing predictive maintenance on a paint finishing system.

INTRODUCTION

Traditional paint spray systems, of the type employed in car manufacturing for example, usually consist of several separate paint lines, each providing a different coloured paint to a spray booth for distribution to a number of user points (e.g. spray applicators). In general, only one colour is sprayed or in use at any one time, so only one line is actively employed whilst the rest remain ready for use.

When a system is not in use because the paint is not being sprayed, it is usual to maintain the spraying pressure and paint velocity in the paint line, by pumping paint from a paint tank around a circuit and back to the tank. This is done for two reasons: firstly, because the liquid paint must be kept moving, otherwise pigmentation may start to settle out in the paint lines; secondly, because the lines must be primed to the required pressure before spraying commences. So-called smart systems such as those disclosed in European Patent EP1789202B1 intelligently adjust the circulation means so that the flow rate in the system is reduced when paint material is not in demand. Such reduction permits a reduced level of wear on components such as pumps. As a result the ideal maintenance schedules of pumps is changed and may vary depending on the amount of time that paint material is in demand (i.e when paint is being sprayed).

Existing maintenance solutions merely allow users to set desired maintenance intervals based on set intervals in relation to time or pump cycles. Traditionally, to ensure redundancy, such maintenance intervals are set based on a worst case scenario for component failures. The provision of maintenance is therefore often inefficient and perfectly serviceable parts may be replaced and discarded.

A further problem with using set maintenance intervals is that if for some reason a part is subjected to a higher than expected wear, it may fail in service before the next scheduled maintenance point.

It is an object of the present invention to provide an improved system and method for performing maintenance on a paint finishing system.

SUMMARY OF INVENTION

In one aspect there is provided a method of performing predictive maintenance on equipment used for delivering liquid paint in a paint finishing facility. The method comprises:
Identifying a set of components of the equipment and associated maintenance requirements,
For each of the components, providing a set of operating parameters that affect useful service life of the component,
For each component, providing an algorithm relating the operating parameters to a remaining time by when a maintenance operation on the component is to be performed,
Monitoring each of the operating parameters during operation of the paint finishing facility,
For each component, applying the algorithm with the monitored operating parameters to calculate the remaining time for the component and
For each component providing to a maintenance operative an alert indication relating to the remaining time for the component.

Predictive maintenance as set out in this method takes into account the actual work done by components in the paint finishing facility. This allows component life to be predicted efficiently, thereby allowing maintenance to take place only when it is required for a particular component. As a result, maintenance intervals may be longer and components are only replaced when necessary. Labour costs for maintenance, machinery downtime, and spare parts costs are reduced. Uptime is increased since the method allows for an accurate prediction as to when wearing components need to be replaced. There is also a reduced chance that a component will fail, especially if it is subjected to a higher work load than usual.

The term "algorithm" as used herein may be in the form of an equation, or set of equations by which the remaining time is calculated but it is not intended to be restricted thereto. For example, the algorithm relating one or more operating parameters to the remaining time may be implemented in the form of look-up tables or other accessible data storage/matching methods.

The operating parameters may comprise one or more of paint tank levels, paint movement between paint tanks, pressure at any point in the paint finishing system, paint flow, paint velocity, motor speed, temperature, pressure in a paint filter, oil level, noise, wear, and greasing schedules. It is advantageous to consider such operating parameters since the value of these parameters is relevant in determining the remaining time of components.

The operating parameters may comprise an abrasive factor configurable to account for the abrasiveness of the liquid paint being pumped.

Considering the abrasiveness of the paint is an important factor in predicting when components such as seals require maintenance or replacing. For example, if the paint is highly abrasive, then seal material may wear at a higher rate during operation.

The operating parameters may comprise an average pressure or flow rate.

The method may further comprise the step of recording data relating to the operating parameters during operation of the paint finishing facility.

Recording the data allows usage of components to be analysed and therefore provide an indication as to how much work a component has done. This information is useful to indicate the health of components and to formulate preventative maintenance on a component by component basis. For example, in an automotive factory Basecoat paint may be applied to a body part of a vehicle in order to provide visual colour and effect. The visual properties of this paint may be chosen by the customer. Subsequently, a Clearcoat paint may be applied on top of the coloured basecoat. The Clearcoat layer typically forms an interface with the environment and is durable enough to resist environmental effects such as abrasion or UV light. The clearcoat paint may also impart further visual effects such as glossiness or "sparkle". Multiple layers of Clearcoat or Basecoat may be combined to form visually desirable effects such as Pearlescence. It should therefore be appreciated that within a factory there may be a wide variation in the level of usage that Clearcoat and Basecoat pumps are subject to. If a paint pump for Clearcoat paint is determined to have a higher usage than a paint pump for Basecoat paint, then earlier maintenance will be required for the Clearcoat paint pump. Furthermore, the formulations of the paints may vary resulting in different levels of wear for each stroke of a pump. As discussed above, it is therefore advantageous to consider material properties of the paint such as abrasiveness as an operating parameter.

The method may further comprise the step of providing to a maintenance operative an indication as to how much work a component has completed. This may be based on an average value of pressure and/or cycle rate that said component is subject to.

The method may further comprise the step of storing a set of maintenance settings on a removable memory storage device. This allows maintenance settings to be backed up or transferred between different components. The maintenance settings may be complex or based on a long history of component operation. Therefore, it is advantageous for the settings to be transferred (or copied using means such as a desktop computer) for use with other components. Furthermore it is quick and easy to duplicate maintenance settings for new installations. For example, the removable memory storage device may comprise a Secure Digital (SD) card that can be interfaced with a desktop computer or laptop in order to manipulate the maintenance settings.

The method may further comprise the step of configuring a graphical user interface to display the alert indication for one or more components. Advantageously the alert indications may be displayed to an operative in the most appropriate manner. For example, a single operative may view the maintenance status of multiple components on a single screen. Data relating to maintenance such as operating parameters or remaining time of components may be displayed to the operative in a colour coded manner. An operative would be able to quickly determine which components require attention. The method may be applied in paint finishing facilities of varying size by adjusting the number of components being visually monitored on the graphical user interface.

The method may further comprise the step of, for each component, interfacing with data comprising a job schedule or job queue in order to predict future operating parameters of a component. This advantageously allows the remaining time of the component to be more accurately calculated and maintenance may be performed more efficiently. For example, it may be determined that a component will be placed under a higher than normal load during a future period of time and therefore it should be replaced during an earlier maintenance interval. This feature is particularly relevant where multiple pumps are used for different coloured paints. Manufactured objects such as cars may be custom ordered in a particular colour. The time remaining/level of wear in pumps for particular colours will therefore depend largely on the amount of cars ordered by customers in particular colours. Customer order data may be fed into a job scheduler or job queue. Data from this job scheduler may be input into the algorithm to retrospectively determine the remaining time of components based on a predicted future workload.

The method may further comprise the step of uploading to a server a first set of data relating to the remaining time for each component and operating parameters of each component.

The method may further comprise the step of downloading from the server a second set of data derived from both the first set of data, and, data uploaded to the server using a plurality of other instances of the method as described above.

The method may further comprise the step of configuring the controller of any of the plurality of paint finishing systems to adjust operating parameters of components based on the second set of data.

The method may further comprise the step of processing the data that has been uploaded to the server in order to determine an optimal set of operating parameters for configuring components in order to increase the remaining time for components.

It is advantageous for data relating to component usage and maintenance requirements (i.e. operating parameters and remaining time) to be uploaded to a server. Multiple paint finishing facilities may perform the similar methods and thereby generate a database comprising information relating to component usage and maintenance requirements for components within different paint finishing facilities. This information can be used to determine how components can be used more efficiently in relation to maintenance requirements. For example, it may be determined that usage of a particular pump in a particular facility is particularly efficient since it results in lower maintenance requirements. Operatives at other facilities are able to observe the operating parameters of the particular pump and thus improve the efficiency of their pumps by applying relevant settings/operating parameters.

As a further example, different paint finishing facilities around the world may operate paint pumps at different cycle rates. At a higher cycle rate, the process of painting items such as cars may be quicker; however a higher level of maintenance will be required. At a lower cycle rate, the process of painting cars may be slower, however less maintenance is required for the pumps. Using the first set of data it is possible to determine how much maintenance is typically required for each cycle rate. There may be an optimal cycle rate to use based on the value produced by painting cars relative to the amount of maintenance required on a pump in a given time-frame. It would be possible to determine this optimal cycle rate by processing the data that is uploaded.

The invention allows operatives from different facilities to share knowledge regarding operation of components in paint finishing facilities over a network such as the Internet. Such knowledge sharing provides for improvements in efficiency in paint finishing systems to be further improved.

In a second aspect of the invention there is provided a paint finishing system comprising:
  equipment used for the delivery of liquid paint, including components having associated maintenance requirements;
  monitoring devices configured to monitor operating parameters that affect useful service life of the components;
  at least one controller having a memory and a processor.

The memory stores, for each component, an algorithm relating the operating parameters to a remaining time by when a maintenance operation on the component is to be performed. The processor is programmed, for each component, to apply the algorithm with the monitored operating parameters to calculate the remaining time for the component and to provide an alert indication relating to the remaining time for the component.

The paint finishing system provided advantageously allows for the predictive maintenance method as described in the first aspect to be performed.

At east one of the components may be a pump.

The pump may comprise one or more of any of the following; a cam follower bearing, a bearing, a cam, a fluid seal, a gearbox or a bellow.

The memory of the controller may be integrated at least partially into a removable memory storage device. Part of the memory may be located on a secure digital (SD) card such as those produced by SanDisk®.

There may be one controller per component.

The controller may be replaceable. This allows for quick access to swap, move and reassign controllers. The system may allow for multiple controllers to be attached to provide extra input and output functionality and to be flexible to future demands. The system is easily replaceable (plug and play). For example, a controller incorporating an input for schedule data may be added in order that this data can be used to more accurately predict when components need to be replaced.

The controller may comprise at least one control card operable to provide a data link to a computing device. Data relating to maintenance requirements can be transferred to or from the control card via a computer such as a desktop PC or a laptop.

The system may further comprise an interface with job schedule data stored on a hard drive. The algorithm may relate to the job schedule data to determine future maintenance requirements.

The controller may further comprise a data connection to a server, wherein the processor of the controller is programmed to upload a first set of data relating to the remaining time for each component and operating parameters of each component to the server using the data connection.

The processor of the controller may be programmed to download a second set of data derived from data uploaded to the server.

The controller may be configured to adjust the operating parameters based on the second set of data.

In a third aspect of the invention there is provided a server comprising:
 a processor and memory; and
 a plurality of data connections to controllers of paint finishing systems.

The processor of the server is programmed to use the plurality of data connections to receive a first set of data comprising operating parameters and an amount remaining time by when a maintenance operation is to be performed on components within each paint finishing system and store the first set of data on the memory. The plurality of data connections may be used to transmit a second set of data derived from the first set of data.

For each component of a paint finishing system, the processor may be programmed to process the first set of data in order to determine optimal operating parameters that when applied to each component increases the amount of remaining time before a maintenance operation is to be performed on components. This information may be stored in the second set of data.

DETAILED DESCRIPTION

Figure 1:
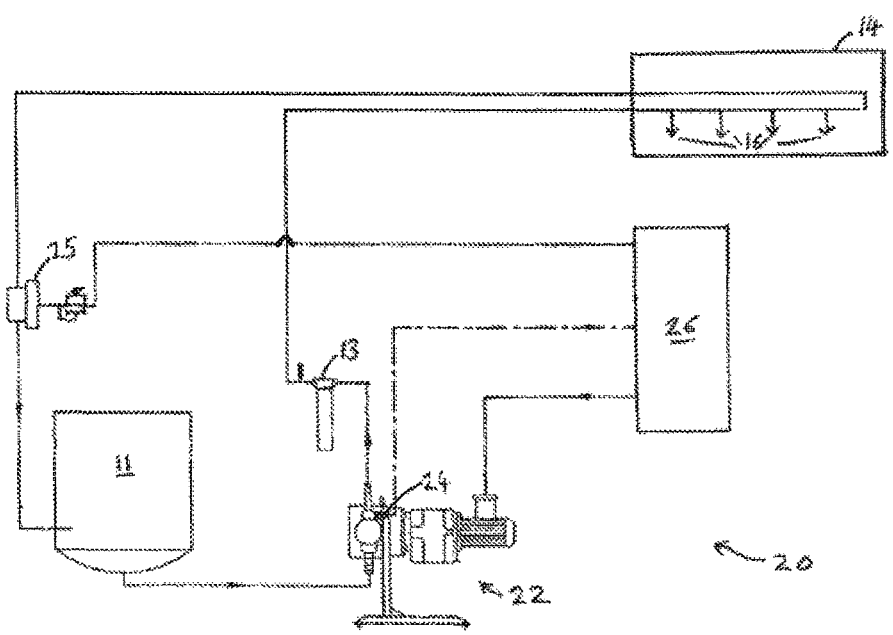
FIG. 1 is a schematic representation of a known paint circulation system.

Referring to FIG. 1, there is shown an example paint circulation system that would be found in a paint finishing facility to which an embodiment of the claimed method may be applied. Paint circulation system 20 includes paint tank 11 containing a reservoir of liquid paint. Hereinafter, the terms Smart Pump or Smart Back Pressure Regulator (Smart BPR) refer to an automatically controlled variable Pump or BPR that is connected to a paint circulation system such as that disclosed in European Patent EP1789202B1. Such a so-called smart system may be configured to automatically control devices such as pumps or BPRs via a connection to a controller 26. As discussed above, the so-called smart system may be configured to intelligently adjust the settings of any devices/components in the system in order that the flow rate in the system is reduced when paint material is not in demand. A smart pump 22 is operable to supply paint from the paint tank 11, optionally through a paint filter 13, to a spray booth 14. The spray booth 14 typically includes one or more applicators 16. For example, these may be spray nozzles manipulated by robot arms. Paint not used in the spray booth 14 is circulated back to the paint tank 11 via an automatically controlled smart BPR 25. The smart pump 22 and smart BPR 25 are controlled from a controller 26. A signal from pressure sensor 24 is provided as an input to the controller 26. The controller 26 may be a programmable logic controller (PLC) or other suitable programmable device. The controller 26 may comprise memory storing control or maintenance settings. The controller 26 may be replaceable in order that different control or maintenance settings are applied or transferred to new pumps. The controller 26 may incorporate data connection interfaces allowing connection for data transfer with other computing devices.

As discussed above, the smart pump 22 intelligently maintains a reduced pressure in the paint line when paint material is not in demand such that a reduced level of wear on components is permitted, whilst retaining the required circulation to prevent settling of pigmentation.

An example of such a paint circulation system is described in the granted European patent application EP1789202B1, the contents of which are hereby incorporated by reference.

Whilst controller 26 is shown as receiving an input from pressure sensor 24, inputs may be received from multiple components. For example, inputs may be received from cam follower bearings, main bearings, cams, fluid seals, bellows, and greasing schedules (parts not individually shown). The inputs may comprise operating parameters such as paint tank levels, paint movement, pressure, flow rate, paint velocity, pump speed, pressures before and after the paint filter, temperature. Operating parameters may be monitored during operation of the paint finishing facility.

Figure 2:
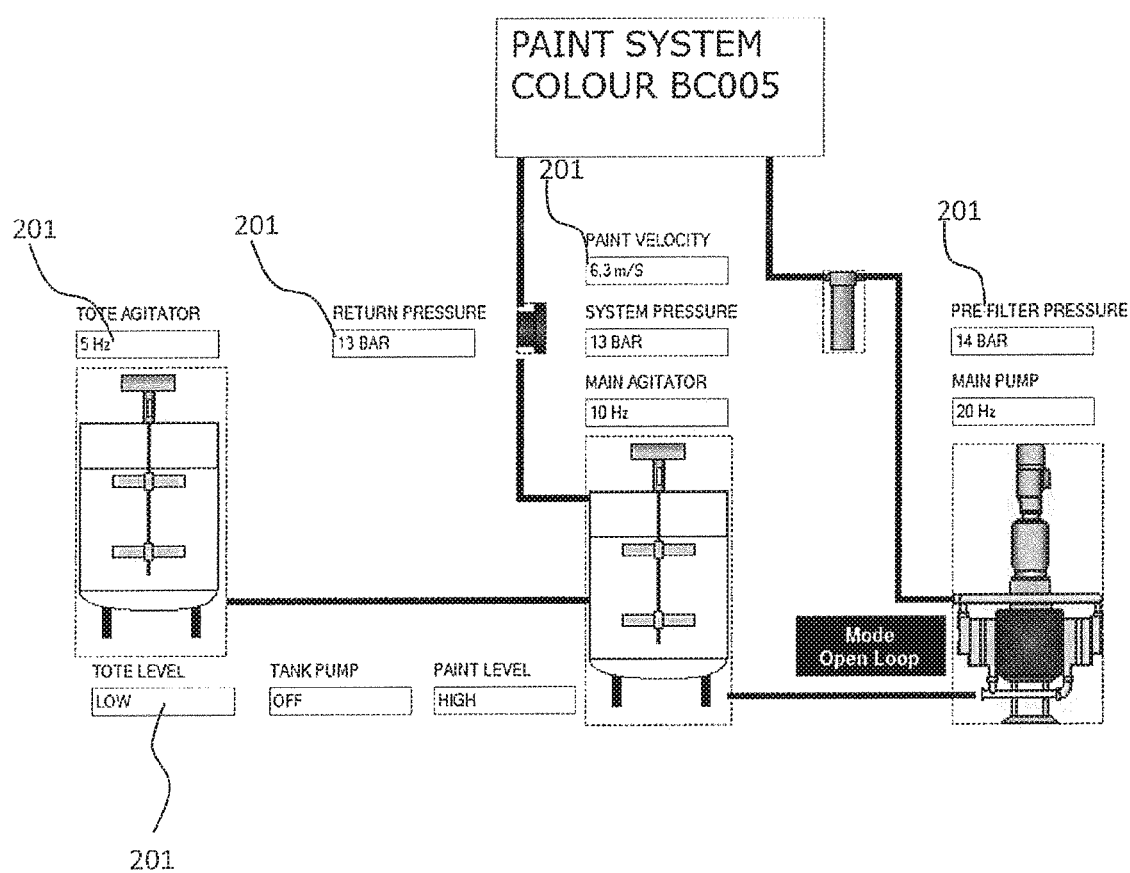
FIG. 2 is a first example screenshot from a computing device running a piece of computer software in accordance with an embodiment of the present invention.

Referring to FIG. 2 there is shown an example screenshot from a computing device (not shown) running a piece of smart pump software. The computing device interfaces with controller 26 (only shown in FIG. 1) in order to display a live status of operating parameters 201. This information may, or may not be displayed on the computing device (not shown), in either case, the operating parameters 201 are monitored by the smart pump software. An algorithm (not shown) is applied to the monitored operating parameters in order to determine the remaining time for components (i.e the remaining amount of time before they require maintenance attention). Elements of the smart pump software may run on controller 26 or the computing device. The computing device may be, for example, a desktop PC, laptop, or a tablet.

The algorithm may be in the form of an equation or set of equations where an output (the remaining time for components) is determined by performing a calculation based on inputs being operating parameters. The algorithm may be implemented in the form of look-up tables or other accessible data storage/matching methods. For example a list of possible inputs and outputs may be stored in computing memory on a database. The correct output may be retrieved from this database using a matching process or similar.

The live operating parameter status may be recorded onto the memory of the controller 26 or a removable memory storage device (not shown). This data may be input to the algorithm to calculate the remaining time for components. The data may be transferred via the removable memory storage device to different pumps so that the data can continue to be utilised even when new pumps are added or a new factory is built containing pumps.

Figure 3:
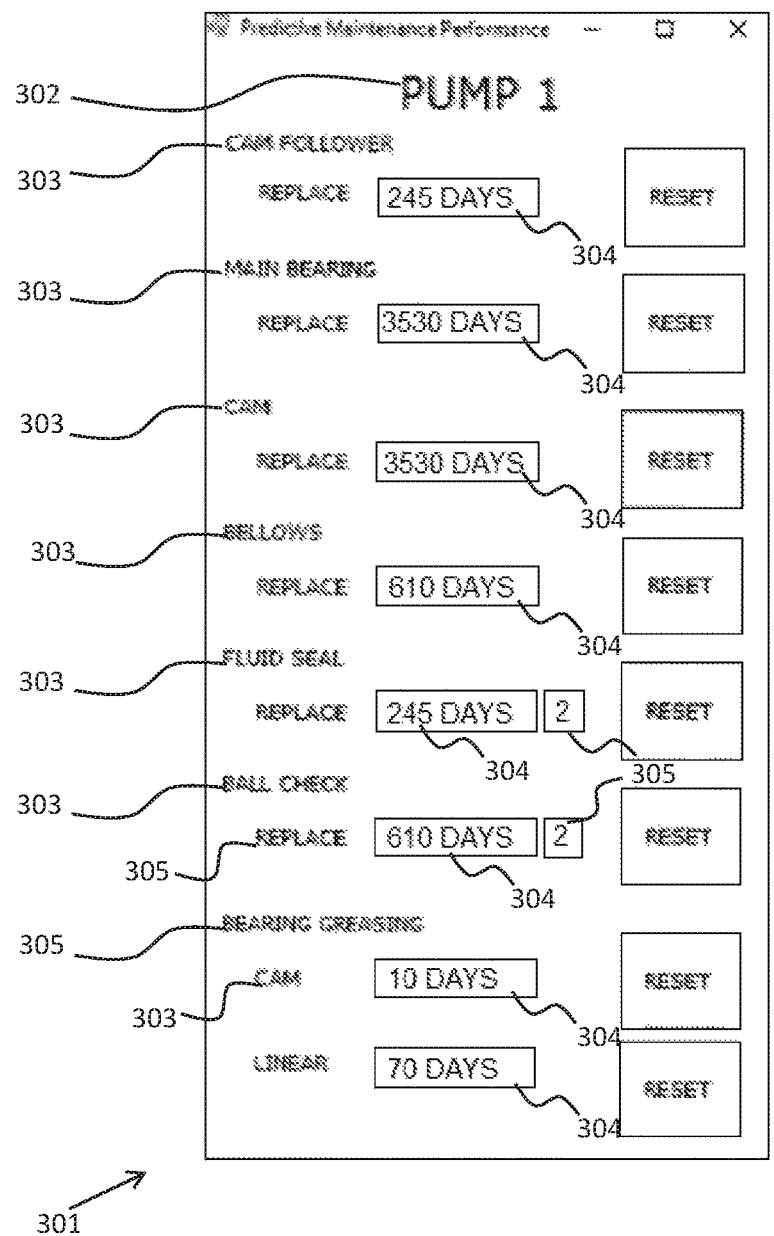
FIG. 3 is a second example screenshot from a computing device running a piece of computer software in accordance with an embodiment of the present invention.

Referring to FIG. 3, there is shown an alert indication relating to the remaining time for components according to an embodiment of the present invention. The alert indication is in the form of an alert window 301 that may be displayed on the screen of a desktop computer, tablet, or laptop that is running the smart pump software program. The alert window 301 may comprise component labels 303 associated with time indicators 304 and maintenance instructions 305. The component labels 303 shown here comprise an example set of components that have been identified. The instruction 305 may be associated with multiple component labels 303 and time indicators 304 as shown, for example, under the "BEARING GREASING" instruction. The time indicators 304 indicate the time remaining for the component that may be calculated using an algorithm relating to operating parameters that affect useful service life of the component.

Some components may have an abrasive factor 305 configurable to account for the abrasiveness of the material being pumped. A maintenance operative viewing alert window 301 can view the current abrasive factor and may be able to manually change it depending on the type of paint being used. The time indicators 304 may be automatically updated using the algorithm when the abrasive factor is manually changed using a computing device running the smart pump software program.

A maintenance operative viewing alert window 301 is able to monitor components during operation and thereby determine which components require attention. By reading the maintenance instructions 305, the maintenance operative knows what action to perform in order to ensure the components are properly maintained. The time indicators may be colour coded depending on how critical component maintenance is required. The viewing alert window 301 may be completely customizable using the smart pump software program. For example, when setting up the system, only some time indicators may be displayed, or information relating to multiple pumps may be displayed.

$$Life_{10Hours} = \frac{1,000,000}{60 \, x \, speed} \times \left[ \frac{/\text{Bearing Rating}\backslash^{33}}{\text{Bearing Load}} \right] \quad \text{Equation 1}$$

Referring to Equation 1 there is shown an example equation that may be programmed into an algorithm of embodiments of the present invention. This equation is a standard calculation used by bearing manufacturers to predict bearing life (or the remaining time for a bearing). It shows that Bearing Speed (Speed) has a relatively small effect on bearing life, and, that Bearing Load is the main factor affecting bearing life. In embodiments, the algorithm may utilise this equation in conjunction with collective data obtained from sources such as prior use of components, predicted future use of components using job queue data (discussed in more detail below) and data from other systems obtained via a network (also discussed in more detail below). Utilising such data allows for predictions to be fine-tuned and to be more accurate.

In the shown embodiment, the alert indication takes the form of a window of the smart pump computer program having a graphical user interface. The operative is only alerted to the remaining time of components when viewing this window. It is also possible for the alert indication to take the form of an alarm, lights, text message, or any other form of electronic notification or visual cue.

Figure 4:
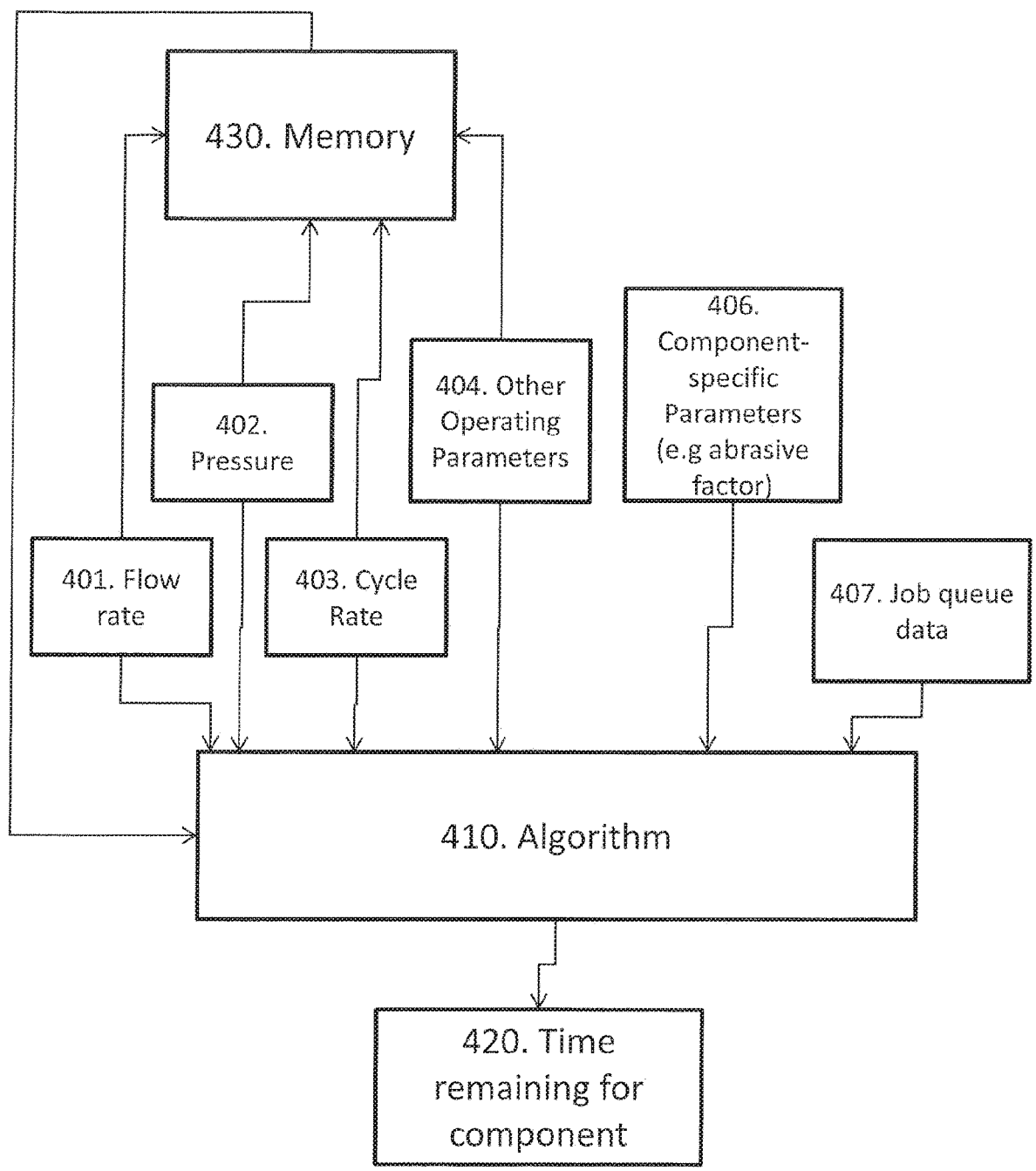
FIG. 4 is a schematic block diagram showing data transfer that takes place in a method and system in accordance with an embodiment of the present invention.

Referring to FIG. 4, a flow diagram showing example inputs to the algorithm is shown. The algorithm 410 may process inputs on the controller 26 or on the computing device (not shown). The algorithm 410 may consider the load that under which components are placed in order to determine the remaining time of components. The load may depend on operating parameters such as pressure 402, flow rate 401, cycle rate 403, or other operating parameters 404. In a smart pump, pressure and flow rate may vary. For example, these values will be lower during periods where paint is not actively being sprayed. The calculated remaining time of components 420 takes these factors into account and provides an accurate remaining time rather than merely utilising the cycle rate as is typical in prior art methods. The value of remaining time 420 may be processed and/or presented on a computing device to a maintenance operative via the alert indication as discussed above. The pressure 402 and flow rate 403 may be recorded into memory 430 and the algorithm 410 may consider the time history of these values. The algorithm may consider average values of pressure, cycle or flow rate. Use of such inputs provides for improved accuracy in determining the remaining time, compared to traditional methods of merely using a single equation such as the equation shown in Equation 1.

For some components, the operating parameters further comprise component-specific parameters such as an abrasive factor 406 that accounts for the abrasiveness of the liquid being pumped in relation to the material of the component. For example, seals may wear out due to the abrasiveness of paint liquid. The rate of such wear may also depend on other operating parameters such as pressure and flow rate.

The algorithm 410 may receive input from job queue data 407. Job queue data may comprise data collected by software that monitors the position of parts throughout an automotive OEM, Tier 1 or industrial plant once the parts have been loaded on a conveyor system. The job queue data may be used to provide demand signals to the colour valves to turn on and turn off the supply of paint to the applicators 16 in the spray booth 14. The job queue data 407 provides an indication as to how much load particular pumps will be placed under during a future period of time. For example, the algorithm may determine that a high number of car parts are to be sprayed red and that; as a result, the red paint pump will require maintenance at a future point in time. Maintenance can therefore be undertaken during an appropriate maintenance interval. The algorithm may further prepare a maintenance schedule based on the planned workload of different pumps.

Figure 5:
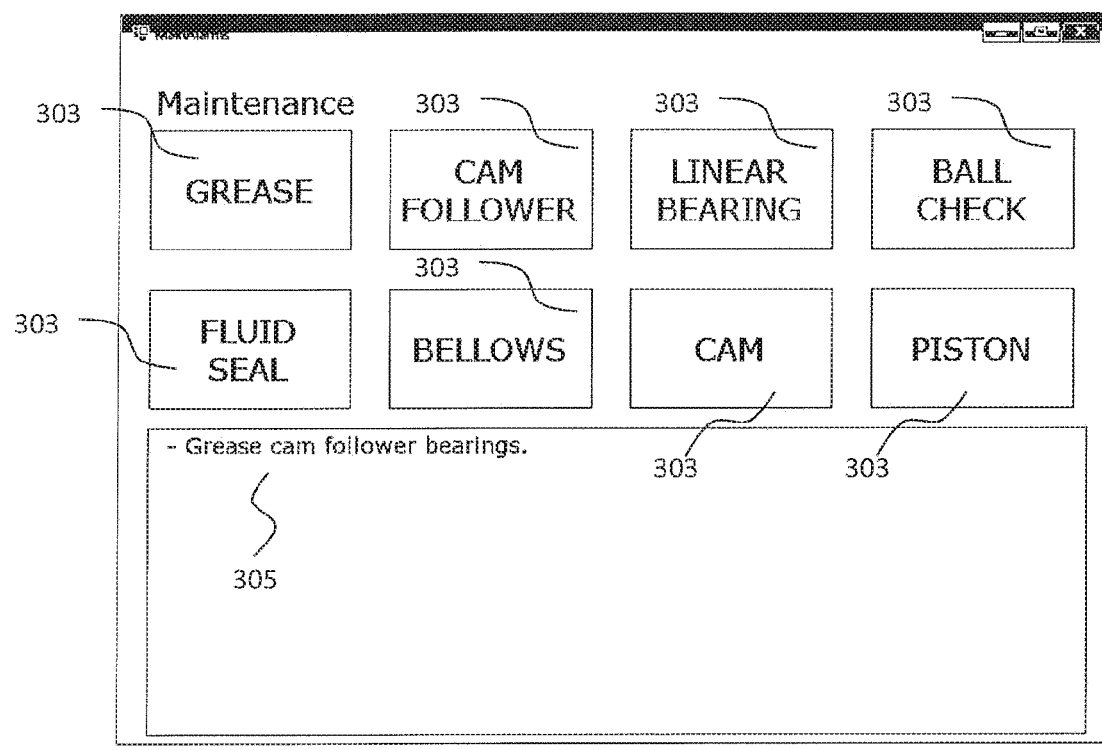
FIG. 5 is a third example screenshot from a computing device running a piece of computer software in accordance with an embodiment of the present invention.

Referring to FIG. 5, there is shown a maintenance alert indication in accordance with some embodiments of the invention. The component labels 303 are displayed and colour coded depending on maintenance actions that are to be taken. Maintenance instructions 305 are displayed below the component labels 303.

Figure 6:
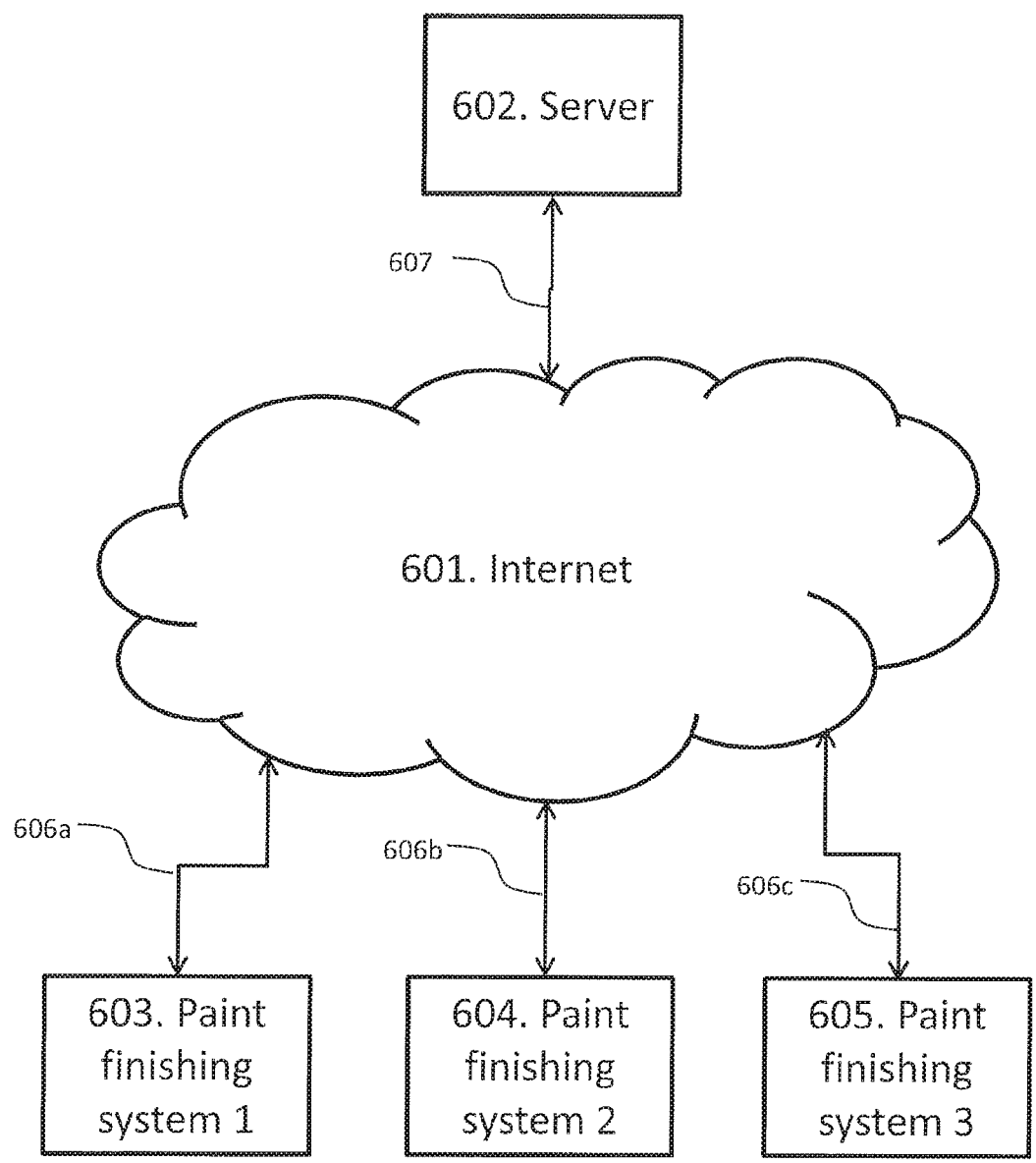
FIG. 6 is a schematic block diagram showing multiple paint finishing systems connect to a server in accordance with an embodiment of the present invention.

Referring to FIG. 6 there is shown a diagram of how multiple paint finishing systems connect to a server according to some embodiments of the present invention. The controllers of paint finishing systems 1, 2 and 3 (603, 604, 605) connect to the internet 601 via internet connections 606*a*-*d*. The controllers may comprise a control card directly interfaced with components. Alternatively the controller is a desktop computer or any other type of computing device having network connectivity. The controller may comprise both a control card and a desktop computer. The server 602 is connected to the internet via connection 607. Connections 606*a*-*d* and 607 could comprise wireless (such as WiFi®) or wired connections through a modem interfacing with an internet provider. Whilst in the embodiment shown there are only three paint finishing systems 603, 604, 605, it will be appreciated that there could be many more systems, for example hundreds or thousands. Likewise, there could be many more servers. The server 602 may be a commercial cloud computing service such as Microsoft® cloud platform.

The paint finishing systems 603, 604, 605 are connected to the server via the internet 601. The controllers (not shown) of the paint finishing systems may record operating parameters and time remaining values for components and store this first set of data on memory. The first set of data may be periodically synchronised (uploaded) to the server at set time intervals. In this case, it is not necessary for the paint finishing systems to be permanently connected to the server via the internet. Alternatively, the operating parameters and time remaining values may be uploaded to the server in real time.

The server 602 processes the first set of data and generates a second set of data. The second set of data may be a statistical analysis of the first set of data. For example, it may contain values such as the average number of times a pump needs to be replaced for each pump cycle rate that a pump may be operated at. The second set of data is transmitted via the internet 601 to paint finishing systems 606*a*-*c*. An operative may view the data using computer software installed on the controller. He may also use software to manipulate the data to obtain useful information such as what the optimal pump cycle rate setting is to ensure maintenance requirements are economical based on data obtained from other paint finishing systems.

Figure 7:
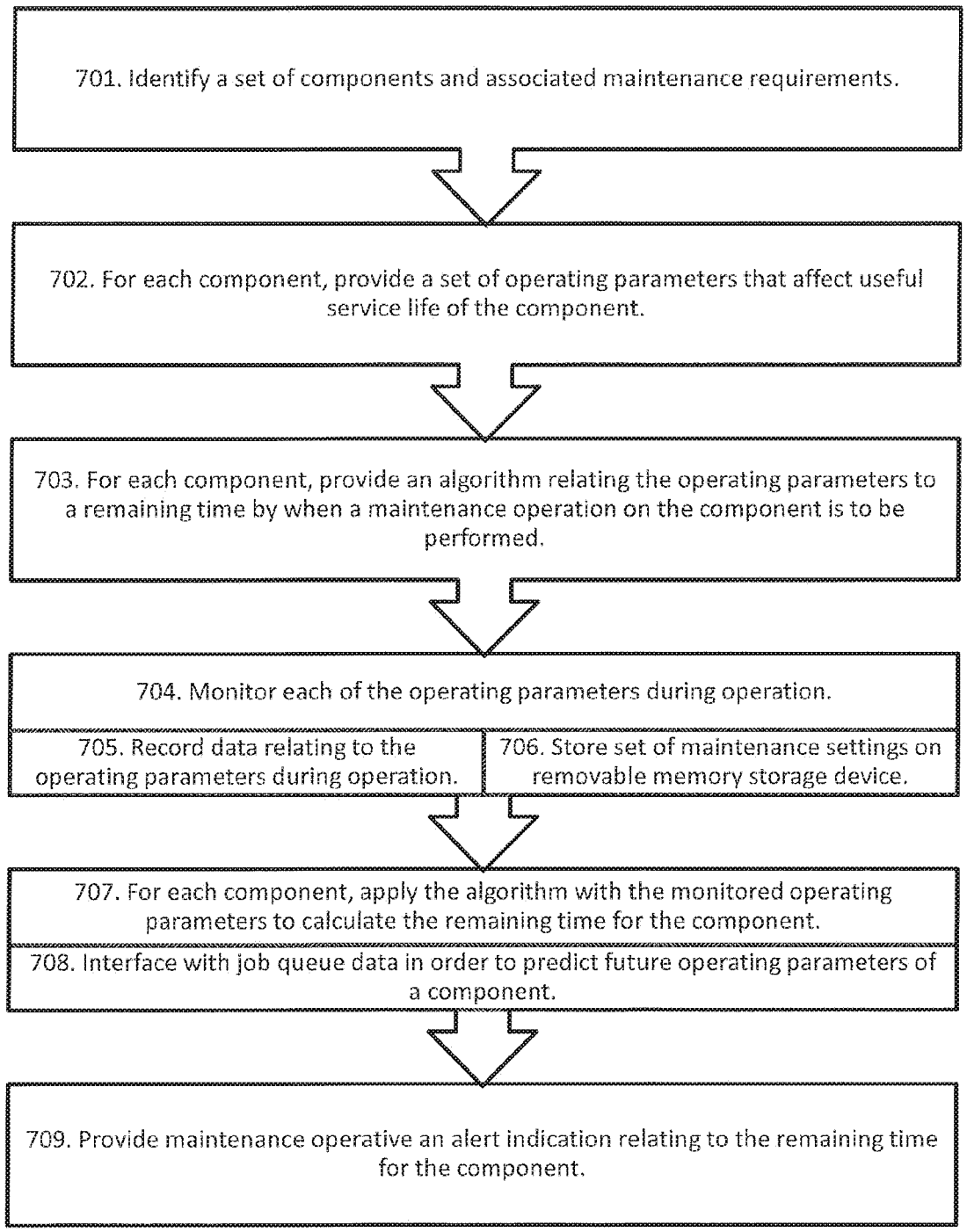
FIG. 7 is a flow diagram showing a method in accordance with an embodiment of the present invention.

Referring to FIG. 7, there is shown a flow diagram representing a method in accordance with embodiments of the present invention.

Initially, as per step 701, a set of components and associated maintenance requirements are identified. Maintenance requirements may be determined with reference to manufacturer literature.

In step 702, for each component, a set of operating parameters is provided that affect the useful service life of the component. For example, if the component is a pump, then operating parameters may include cycle rate and pressure.

In step 703, an algorithm is provided for each component relating operating parameters to a remaining time by when a maintenance operation on the component is to be performed. For example, the algorithm may determine that if the pump is operated at a particular cycle rate and pressure for a given length of time, then a maintenance operation of replacing the pump must be undertaken in two weeks. Accordingly, each of the operating parameters are monitored during operation in step 704. At the same time, data may be recorded relating to the operating parameters during operation in step 705. The data may be used to further improve the efficiency of components as discussed above. Maintenance settings may be stored on a removable memory storage device as per step 706 in order that they can be easily copied to other components. Maintenance settings may comprise data relating to the time remaining by when a maintenance operation on a component is to be performed based on past usage of the component. Whilst steps 705 and 706 are shown in FIG. 7 to take place in conjunction with step 4, these steps could also take place in conjunction with any other step such as step 707.

During step 707, the algorithm is applied with the monitored operating parameters to calculate the remaining time for the component. As discussed above, the algorithm may be an equation having an input and an output. Alternatively it may be a look-up table comprising a static set of data. The method may involve interfacing with job queue data in order to predict future operating parameters of a component as per step 708. Step 708 may take place at any point in the shown method.

During step 709, a maintenance operative is provided an alert indication relating to the remaining time for the component.

Figure 8:
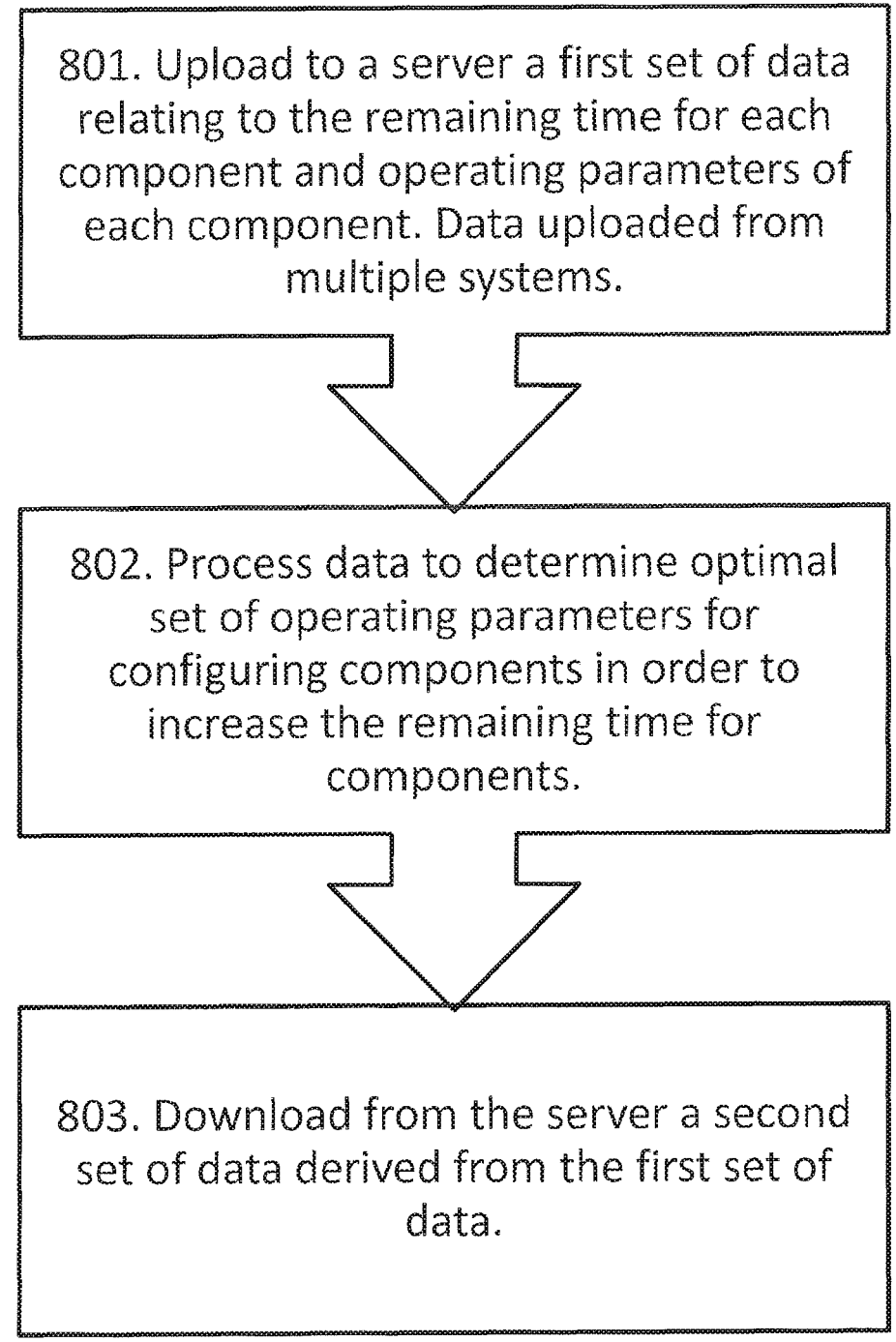
FIG. 8 is a flow diagram showing a portion of a method in accordance with an embodiment of the present invention.

Referring to FIG. 8, there is shown a flow diagram representing a portion of a method in accordance with embodiments of the present invention. The first step of this method 801 may place after any of the steps as shown in FIG. 7 from when the remaining time has been calculated such as step 703.

In step 801, a first set of data is uploaded to a server. The first set of data relates to the remaining time for each component and operating parameters of each component. The data may be uploaded from multiple paint finishing systems and may be via the internet.

In step 802, the data is processed to determine an optimal set of operating parameters for configuring components in order to increase the remaining time for components. This processing may be undertaken on the server (i.e using the processor and memory of the server).

In step 803, a second set of data derived from the first set of data is downloaded. Typically, this process will take place using a computing device or controller in a paint finishing system.

The invention claimed is:

1. A method of performing predictive maintenance on equipment of a paint finishing system used for delivering liquid paint in a paint finishing facility, the method comprising:

identifying a set of components of the equipment and associated maintenance requirements;

for each component of the set of components, providing a respective set of operating parameters that affect useful service life of the component;

for each component of the set of components, monitoring, via a controller of the paint finishing system, each operating parameter of the respective set of operating parameters during operation of the paint finishing system;

interfacing with job queue data in order to predict respective future operating parameters of each component of the set of components;

for each component of the set of components, applying, via the controller, an algorithm with the respective monitored set of operating parameters and the respective future operating parameters as inputs to the algorithm to calculate a remaining time by when a maintenance operation is to be performed for the component;

for each component of the set of components, providing to a maintenance operative an alert indication relating to the calculated remaining time for the component;

uploading, from the controller to a server, a first set of data relating to the respective calculated remaining time for each component of the set of components and relating to the respective set of operating parameters of each component of the set of components; and for each component of the set of components, downloading, from the server to the controller, a second set of data derived from the first set of data and derived from data uploaded to the server from a different paint finishing facility.

2. The method of claim 1, wherein the respective set of operating parameters for at least one component of the set of components comprises one or more of paint tank levels, paint movement between paint tanks, motor speed, pressure in a paint filter, oil level, noise, and greasing schedules.

3. The method of claim 1, wherein the respective set of operating parameters for at least one component of the set of components comprises an abrasive factor configurable to account for the abrasiveness of the liquid paint being pumped.

4. The method of claim 1, wherein the respective set of operating parameters for at least one component of the set of components comprises an average pressure and flow rate.

5. The method of claim 1, further comprising:

recording data relating to the respective sets of operating parameters for each component of the set of components during operation of the paint finishing system.

6. The method of claim 5, further comprising:

for at least one component of the set of components, providing to the maintenance operative an indication as to how much work the at least one component has completed.

7. The method of claim 6, wherein the indication is based on an average value of pressure and/or cycle rate that the at least one component has been subject to.

8. The method of claim 1, further comprising:

storing a set of maintenance settings on a removable memory storage device.

9. The method of claim 1, further comprising:

configuring a graphical user interface to display the alert indication for one or more components of the set of components.

10. The method of claim 1, further comprising:

adjusting, via the controller of the paint finishing system, the respective set of operating parameters of at least one component of the set of components based on the second set of data.

11. The method of claim 1, further comprising:

processing data stored on the server to determine an optimal set of operating parameters for configuring at least one component of the set of components to increase the respective calculated remaining time for the at least one component.

12. The method of claim 1, comprising: for at least one component of the set of components, displaying, via a display, the respective calculated remaining time by when the maintenance operation on the at least one component is to be performed.

13. The method of claim 1, comprising, for each component of the set of components, displaying, via a display, the respective calculated remaining time by when the maintenance operation on the component is to be performed.

14. The method of claim 1, wherein the algorithm relates the respective set of operating parameters and the respective future operating parameters to the respective calculated remaining time by when the maintenance operation on the component is to be performed.

* * * * *